United States Patent
Kim et al.

(10) Patent No.: US 9,849,754 B2
(45) Date of Patent: Dec. 26, 2017

(54) AIR EXTRACTOR GRILL FOR VEHICLE

(71) Applicants: Hyundai Motor Company, Seoul (KR); KIA MOTORS CORP., Seoul (KR)

(72) Inventors: Eung Young Kim, Whasung-Si (KR); Byeong Moo Jang, Whasung-Si (KR); Jun Mo Ku, Whasung-Si (KR)

(73) Assignees: Hyundai Motor Company, Seoul (KR); KIA MOTORS CORP., Seoul (KR)

( * ) Notice: Subject to any disclaimer, the term of this patent is extended or adjusted under 35 U.S.C. 154(b) by 477 days.

(21) Appl. No.: 14/517,586

(22) Filed: Oct. 17, 2014

(65) Prior Publication Data
US 2015/0321540 A1     Nov. 12, 2015

(30) Foreign Application Priority Data
May 12, 2014 (KR) .................. 10-2014-0056665

(51) Int. Cl.
    *B60H 1/34*        (2006.01)
    *B60H 1/24*        (2006.01)

(52) U.S. Cl.
    CPC ........... *B60H 1/249* (2013.01); *B60H 1/3407* (2013.01)

(58) Field of Classification Search
    CPC ................................................. B60H 1/249
    USPC ....................................................... 454/162
    See application file for complete search history.

(56) References Cited

U.S. PATENT DOCUMENTS

| | | | | |
|---|---|---|---|---|
| 4,691,623 A * | 9/1987 | Mizusawa | ............. | B60H 1/249 137/512.15 |
| 4,781,106 A * | 11/1988 | Frien | ..................... | B60H 1/249 137/512.1 |
| 5,085,132 A * | 2/1992 | Ikeda | ..................... | B60H 1/249 454/158 |
| 5,419,739 A * | 5/1995 | Lewis | .................... | B60H 1/249 137/855 |
| 5,492,505 A * | 2/1996 | Bell | ....................... | B60H 1/249 137/855 |

(Continued)

FOREIGN PATENT DOCUMENTS

| | | |
|---|---|---|
| JP | 11-001120 A | 1/1999 |
| JP | 2003-246214 A | 9/2003 |

(Continued)

*Primary Examiner* — Steven B McAllister
*Assistant Examiner* — Jonathan Cotov
(74) *Attorney, Agent, or Firm* — Morgan, Lewis & Bockius LLP (57) ABSTRACT

An air extractor grill for a vehicle may include a housing fixedly mounted at a portion on the vehicle separating inside and outside spaces of the vehicle and provided with through holes having a plurality of grills, an outer cover coupled with one surface of an outside of the housing and having an opened inner space provided with a plurality of outer barrier ribs, and a plurality of valves including upper portions fitted between the housing and the outer cover to be closely disposed to the housing to seal the through holes when the outer cover is connected with the housing, the plurality of valves being operated to open the through holes while lower portions of the plurality of valves rotate toward the outer cover based on the fixed upper portions when air inside the vehicle needs to be discharged to the outside of the vehicle.

15 Claims, 9 Drawing Sheets

(56) References Cited

U.S. PATENT DOCUMENTS

| | | | | |
|---|---|---|---|---|
| 5,601,117 | A * | 2/1997 | Lewis | B60H 1/249 137/527.8 |
| 5,759,097 | A * | 6/1998 | Bernoville | B60H 1/249 137/512.1 |
| 5,823,870 | A * | 10/1998 | Emerling | B60H 1/249 137/512.15 |
| 6,210,266 | B1 * | 4/2001 | Barton | B29C 45/1676 137/855 |
| 6,468,148 | B1 * | 10/2002 | Furusawa | B60H 1/249 137/858 |
| 6,648,749 | B2 * | 11/2003 | Hayashi | B60H 1/249 454/162 |
| 7,137,880 | B2 * | 11/2006 | Omiya | B60H 1/249 454/162 |
| 7,517,280 | B2 * | 4/2009 | McConnell | B60H 1/249 137/512.1 |
| 8,360,104 | B2 * | 1/2013 | Shereyk | B60H 1/249 137/852 |
| 8,419,513 | B2 * | 4/2013 | Weber | B60H 1/249 454/162 |
| 8,485,872 | B2 * | 7/2013 | Valencia, Jr. | B60H 1/249 123/73 AV |
| 8,955,542 | B2 * | 2/2015 | Kiezulas | B60H 1/249 137/512 |
| 9,097,353 | B2 * | 8/2015 | Loewe | B60H 1/249 |
| 9,440,511 | B2 * | 9/2016 | Hofmann | B60H 1/248 |
| 2003/0017799 | A1 * | 1/2003 | Hayashi | B60H 1/249 454/162 |
| 2005/0075064 | A1 * | 4/2005 | Omiya | B60H 1/249 454/162 |
| 2007/0184772 | A1 * | 8/2007 | McConnell | B60H 1/249 454/139 |
| 2008/0076344 | A1 * | 3/2008 | Flowerday | B60H 1/249 454/162 |
| 2009/0280736 | A1 * | 11/2009 | Schneider | B60H 1/249 454/162 |
| 2014/0057543 | A1 * | 2/2014 | Kim | B60H 1/249 454/165 |

FOREIGN PATENT DOCUMENTS

| | | |
|---|---|---|
| KR | 1998-085534 A | 12/1998 |
| KR | 20-2001-0002068 U | 1/2001 |
| KR | 10-2004-0041377 A | 5/2004 |
| KR | 10-2004-0085947 A | 10/2004 |
| KR | 10-2005-0080761 | 8/2005 |
| KR | 10-2006-0062396 A | 6/2006 |
| KR | 10-2010-0023396 | 3/2010 |

* cited by examiner

AIR EXTRACTOR GRILL FOR VEHICLE

CROSS REFERENCE TO RELATED APPLICATION

The present application claims priority to Korean Patent Application No. 10-2014-0056665, filed May 12, 2014, the entire contents of which is incorporated herein for all purposes by this reference.

BACKGROUND OF THE INVENTION

Field of the Invention

The present invention relates to an air extractor grill for a vehicle, and more particularly, to an air extractor grill for a vehicle capable of improving a function of cutting off the introduction of external noise, dust, and exhaust gas into a vehicle.

Description of Related Art

An air extractor grill is equipped in a vehicle to discharge high pressure air inside the vehicle to the outside and constantly keep an air pressure inside the vehicle at all times, and in particular, serves to smoothly close a vehicle door by removing a high pressure inside the vehicle which is instantly generated at the time of closing the vehicle door and improve ventilation performance and defrost performance by easily introducing external fresh air into the vehicle at the time of operating a blower.

Figure 1:
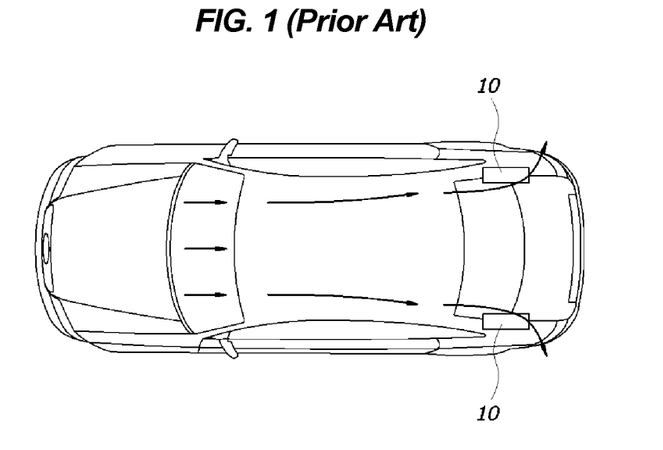
FIG. 1 is a view illustrating a state in which indoor air is discharged to the outside through an air extractor grill equipped in a vehicle according to the related art.
Figure 2:
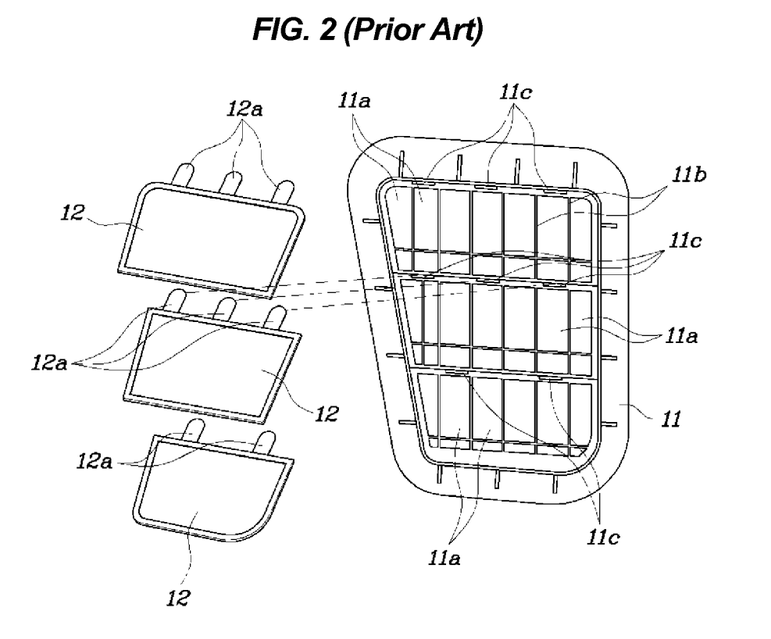
FIG. 2 is an exploded perspective view of an air extractor grill according to the related art.
Figure 3:
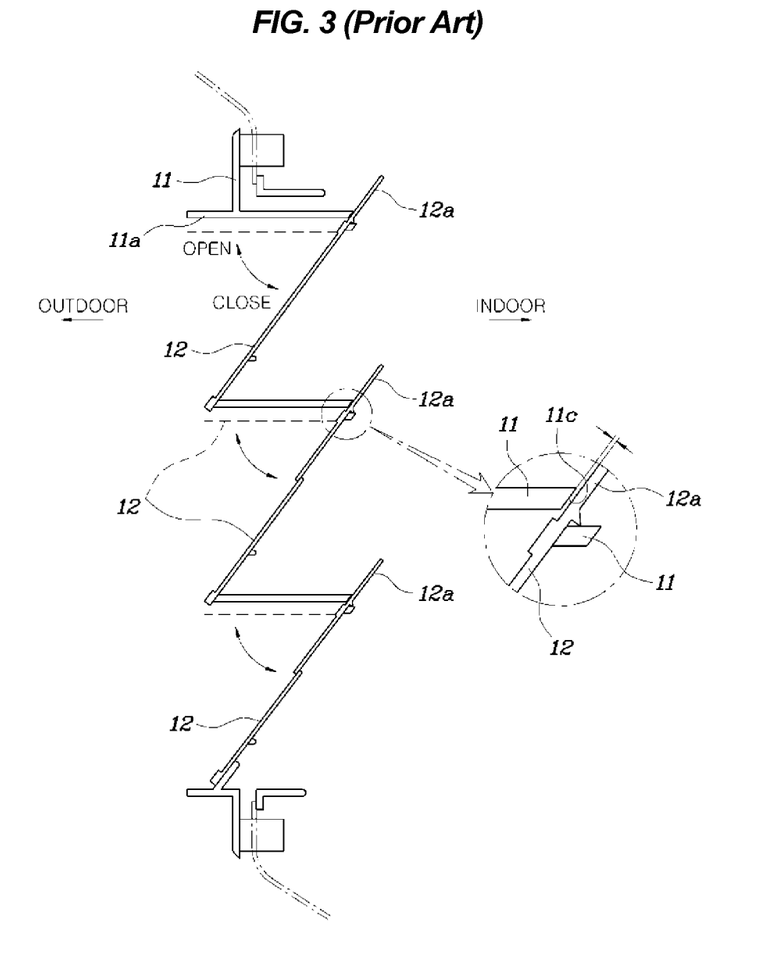
FIG. 3 is a cross-sectional view of a coupled state of FIG. 2 according to the related art.
Figure 4:
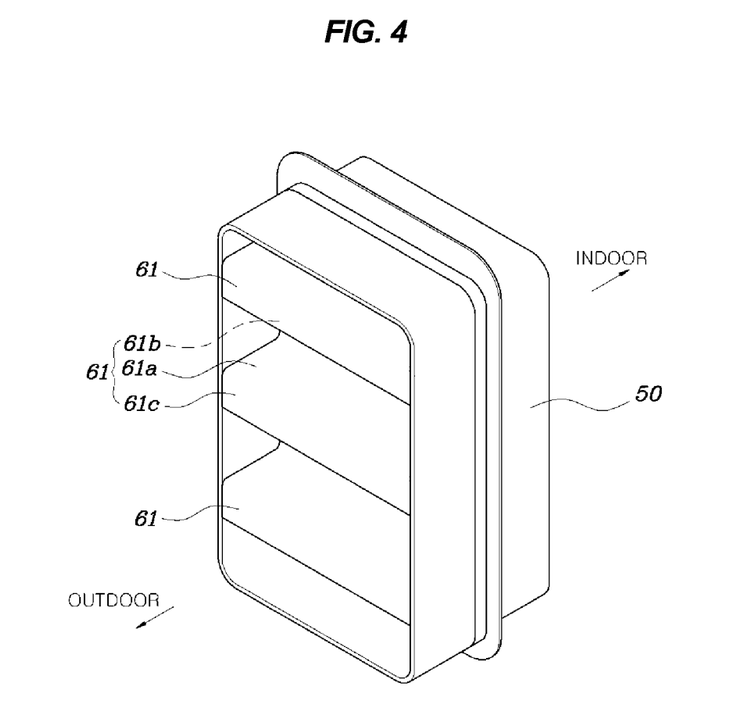
FIG. 4 is a perspective view of an exemplary air extractor grill according to the present invention.

As illustrated in FIGS. 1, 2 and 3, an air extractor grill 10 according to the related art is configured to include a housing 11 provided with a through hole 11a which is provided with a plurality of grills 11b and a plurality of valves 12 rotatably coupled with the housing 11 and opening and closing the through hole 11a based on a difference between air pressures inside and outside a vehicle.

Each valve 12 is integrally provided with a plurality of hinge protrusions 12a, in which each hinge protrusion 12a has a structure to be fitted in a hinge groove 11c formed in the housing 11. Therefore, when there is a need to discharge air inside the vehicle to the outside, the valve 12 rotates with respect to the housing 11 while a portion of the valve 12 connected with the hinge protrusion 12a is elastically bent.

However, as described above, the air extractor grill 10 according to the related art has a structure in which external noise is originally introduced into the vehicle through the opened through hole 11a when the valve 12 is opened. That is, the air extractor grill 10 is not provided with a separate structural apparatus to cut off the introduction of the external noise into the vehicle, and therefore indoor noise may be increased.

Further, the air extractor grill 10 according to the related art has a structure in which the hinge protrusion 12a of the valve 12 is fitted in the hinge groove 11c of the housing 11 and as an adhesion between the housing 11 and the valve 12 is reduced when the valve 12 is closed, a gap C1 may be generated between the housing 11 and the valve 12 and the external dust and noise, the exhaust gas, and the like may be introduced into the vehicle through the gap C1.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air extractor grill for a vehicle capable of more improving a function of cutting off the introduction of external noise into a vehicle when a valve is opened and cutting off the introduction of external dust, noise, exhaust gas, and the like into the vehicle by preventing a gap from being generated between a housing and the valve when the valve is closed.

According to various embodiments of the present invention, an air extractor grill for a vehicle may include a housing fixedly mounted at a portion on the vehicle separating inside and outside spaces of the vehicle and provided with through holes having a plurality of grills, an outer cover coupled with one surface of an outside of the housing and having an opened inner space provided with a plurality of outer barrier ribs, and a plurality of valves including upper portions fitted between the housing and the outer cover to be closely disposed to the housing to seal the through holes when the outer cover is connected with the housing, the plurality of valves being operated to open the through holes while lower portions of the plurality of valves rotate toward the outer cover based on the fixed upper portions when air inside the vehicle needs to be discharged to the outside of the vehicle.

Each outer barrier rib of the plurality of outer barrier ribs may be vertically spaced apart from each other in the outer cover, and air passages facing the valves may be disposed between the outer barrier ribs or between the outer barrier ribs and the outer cover.

Each outer barrier rib of the plurality of outer barrier ribs may include a horizontal part extending in a direction in which the outer cover is coupled to the housing, an upward bent part bent upward from an end of the horizontal part, and a downward bent part bent downward from another end of the horizontal part, in which each outer barrier rib is formed so that at least both side portions of each outer barrier rib are connected to an inner surface of the outer cover.

An upper portion of each valve of the plurality of valves may be provided with a plurality of valve holes which are spaced apart from each other in left and right directions of each valve, each of the valve holes may be penetrated and inserted with housing protrusions formed in the housing and cover protrusions formed in the outer cover, each of the housing protrusions and each of the cover protrusions may penetrate through each of the valve holes in an opposite direction to each other, and ends of the housing protrusions penetrating through the valve holes and ends of the cover protrusions may each be inserted into protruding holes which are formed in the outer cover and the housing.

The housing protrusions and the cover protrusions may alternately penetrate through the valve holes in left and right directions of the valve one by one.

The upward bent part may be integrally provided with a support rib which protrudes toward the grill, a tip of the support rib may be provided with the cover protrusions and the protruding holes, and when an end of each housing protrusion and an end of each cover protrusion penetrate through each corresponding valve hole and then are each inserted into corresponding protruding holes formed in the outer cover and the housing, both surfaces of the upper portion of the valve may adhere to the tip of the support rib and a portion at which the grill is formed in the housing, respectively.

A notch groove extending in a straight line up to left and right sides of each valve may be formed under the valve holes at one surface of each valve which directs to the outer cover, the notch groove may be disposed under the support rib to prevent contact with the tip of the support rib, and each valve may open and close each through hole while each valve rotates based on the notch groove.

According to various aspects of the present invention, an air extractor grill for a vehicle may include a housing fixedly mounted at a portion on the vehicle separating inside and outside spaces of the vehicle and provided with through holes having with a plurality of grills, an outer cover coupled with a surface of an outside of the housing and having an opened inner space provided with a plurality of outer barrier ribs, an inner cover coupled with a surface of the inside of the housing and have the opened inner space provided with a plurality of inner barrier ribs, and a plurality of valves including upper portions fitted between the housing and the outer cover to be closely disposed to the housing to seal the through holes when the outer cover is connected with the housing, the plurality of valves being operated to open the through holes while lower portions of the plurality of valves rotate toward the outer cover based on the fixed upper portions when air inside the vehicle needs to be discharged to the outside of the vehicle.

Each outer barrier rib of the plurality of outer barrier ribs may be vertically spaced apart from each other in the outer cover and air passages facing the valves may be disposed between the outer barrier ribs or between the outer barrier ribs and the outer cover.

Each inner barrier rib of the plurality of inner barrier ribs may be vertically spaced apart from each other in the inner cover, and air passages facing the valves may be disposed between the inner barrier ribs or between the inner barrier ribs and the inner cover.

Each outer barrier rib of the plurality of barrier ribs may include a horizontal part extending in a direction in which the outer cover is coupled to the housing, an upward bent part bent upward from an end of the horizontal part, and a downward bent part bent downward from another end of the horizontal part, wherein each outer barrier rib may be formed so that at least both side portions of each outer barrier rib are connected to an inner surface of the outer cover.

Each inner barrier rib of the plurality of inner barrier ribs may include a horizontal part extending in a direction in which the inner cover is coupled with the housing, an upward bent part bent upward from an end of the horizontal part, and a downward bent part bent downward from another end of the horizontal part, wherein each inner barrier rib is formed so that at least both side portions of each inner barrier are connected to an inner surface of the inner cover.

An end of the downward bent part of each inner barrier rib may be disposed between an end of the downward bent part of an outer barrier rib disposed at a top portion and an end of the upward bent part disposed at a bottom portion in the outer barrier ribs which are vertically disposed to be adjacent to each other.

An upper portion of each valve of the plurality of valves may be provided with a plurality of valve holes which are spaced apart from each other in left and right directions of each valve, each of the valve holes may be penetrated and inserted with housing protrusions formed in the housing and cover protrusions formed in the outer cover, each of the housing protrusions and each of the cover protrusions may penetrate through each of the valve holes in an opposite direction to each other, and ends of the housing protrusions penetrating through the valve holes and ends of the cover protrusions may each be inserted into protruding holes which are formed in the outer cover and the housing.

The housing protrusions and the cover protrusions may alternately penetrate through the valve holes in left and right directions of the valve one by one.

The upward bent part may be integrally provided with a support rib which protrudes toward the grill, a tip of the support rib may be provided with the cover protrusions and the protruding holes, and when an end of each housing protrusion and an end of each cover protrusion may penetrate through each corresponding valve hole and then may each be inserted into corresponding protruding holes formed in the outer cover and the housing, both surfaces of the upper portion of the valve adhere to the tip of the support rib and a portion at which the grill is formed in the housing, respectively.

A notch groove extending in a straight line up to left and right sides of each valve may be formed under the valve holes at one surface of each valve which directs to the outer cover, the notch groove may be disposed under the support rib to prevent contact with the tip of the support rib, and each valve may open and close each through hole while the valve rotates based on the notch groove.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As illustrated in FIGS. 4 to 7, the air extractor grill according to various embodiments of the present invention is configured to include a housing 50, an outer cover 60, and valves 70.

That is, the air extractor grill for a vehicle is configured to include a housing 50 which is fixedly mounted at a portion connecting between spaces inside and outside a vehicle and is provided with through holes 51 provided with a plurality of grills 52, an outer cover 60 which is coupled with one surface of an outside of the housing 50 and has an opened inner space provided with a plurality of outer barrier ribs 61, and a plurality of valves 70 which have upper portions fitted between the housing 50 and the outer cover 60 to be closely disposed to the housing 50 to seal the through holes 51 when the outer cover is connected with the housing and are operated to open the through holes 51 while lower portions of the plurality of valves 70 rotate toward the outer cover 60 based on the fixed upper portions when air in the vehicle needs to be discharged to the outside.

The plurality of outer barrier ribs 61 have a structure to be vertically spaced apart from each other in the outer cover 60 and air passages 81 facing the valves 70 are disposed between the outer barrier ribs 61 which are vertically disposed or between the outer barrier ribs 61 and the outer cover 60.

Figure 7:
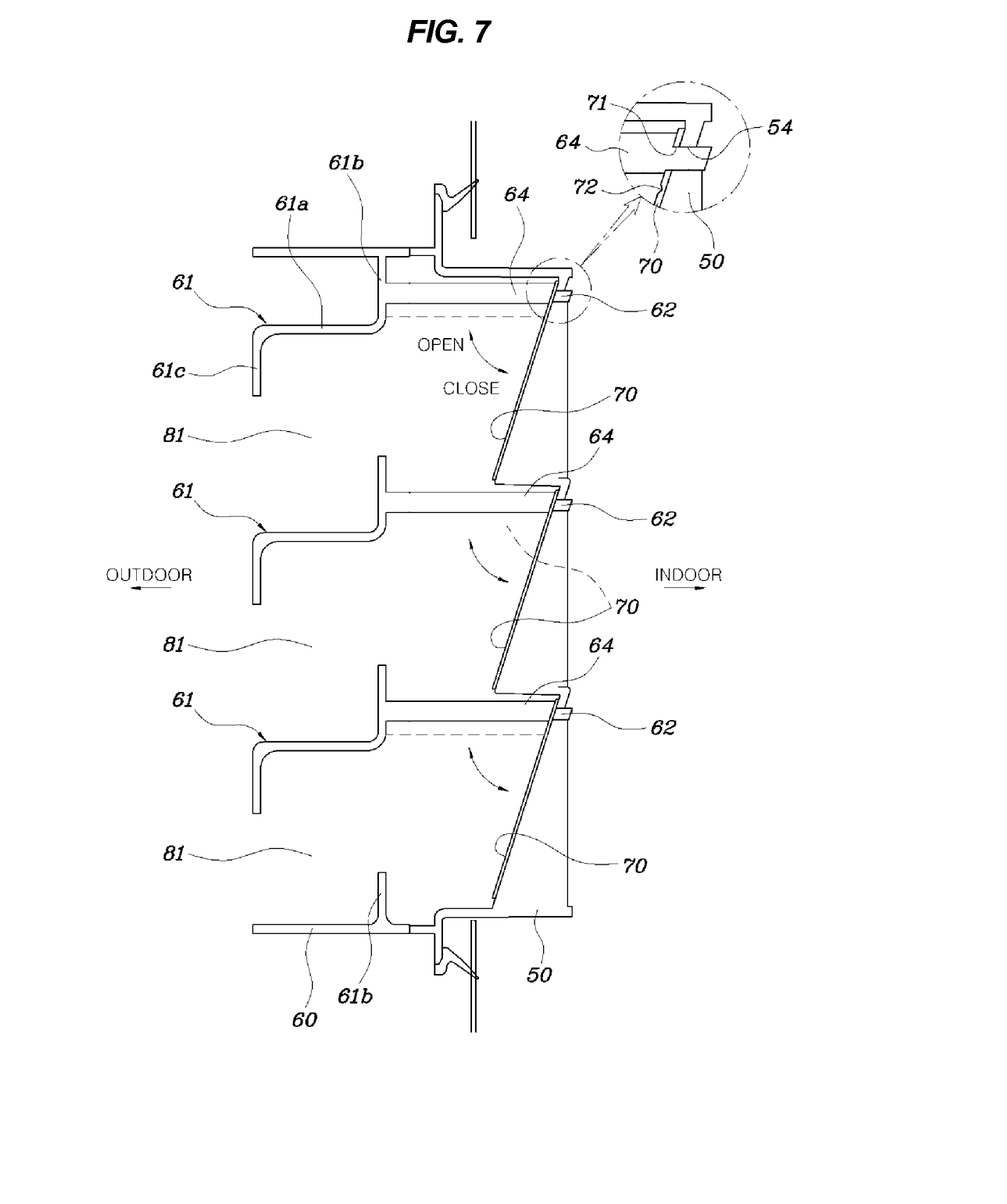
FIG. 7 is a longitudinal cross-sectional view of FIG. 4 according to the present invention.

The air passage 81 becomes a passage through which air inside the vehicle may be discharged to the outside when the valves 70 are opened.

Figure 5:
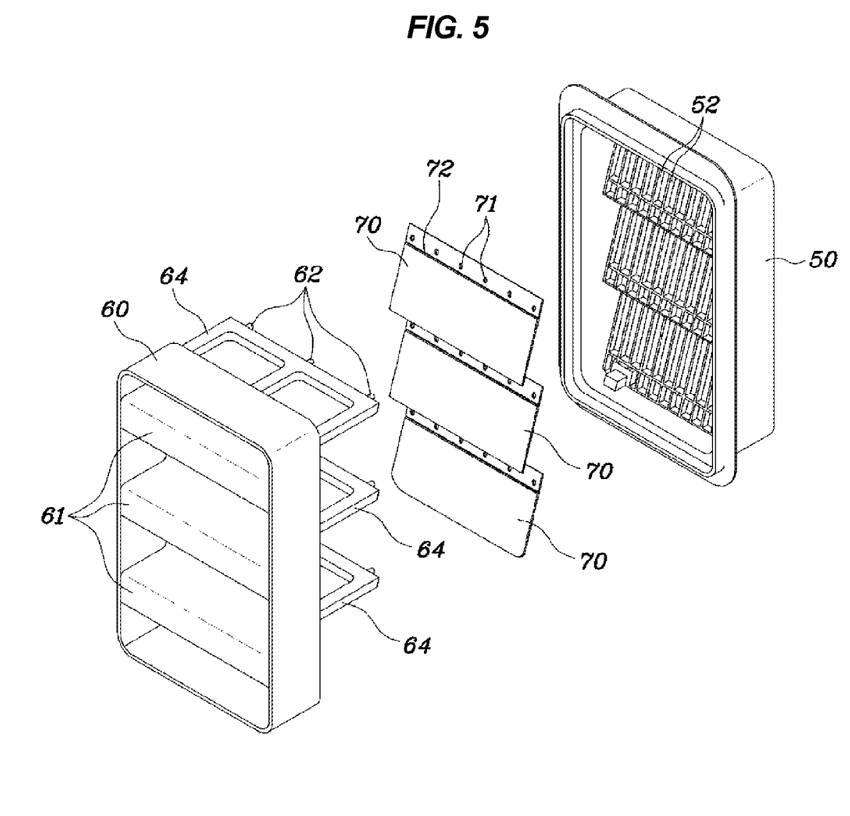
FIG. 5 is an exploded perspective view of FIG. 4 according to the present invention.

Further, the outer barrier rib 61 includes a horizontal part 61a which extends in a direction in which the outer cover 60 is coupled with the housing 50, an upward bent part 61b which is bent upward from one end of the horizontal part 61a, and a downward bent part 61c which is bent downward from the other end of the horizontal part 61a.

That is, the outer barrier rib 61 has a structure having a zigzag shape in which the upward bent part 61b, the horizontal part 61a, and the downward bent part 61c are integrally connected to one another.

In this configuration, when the valve 70 is opened, the upward bent part 61b and the downward bent part 61c serve to cut off the introduction of external noise, dust, exhaust gas, and the like into the vehicle as much as possible.

The outer barrier ribs 61 have a structure in which at least both side portions thereof are integrally formed to be connected to an inner side portion of the outer cover 60, the outer barrier rib 61 disposed at a top portion among the outer barrier ribs 61 has a structure in which an end of the upward bent part 61b is also connected to the upper portion inside the outer cover 60, and a lower portion inside the outer cover 60 has a structure in which only the upward bent part 61b of the outer barrier rib 61 is formed to protrude upward.

Figure 6:
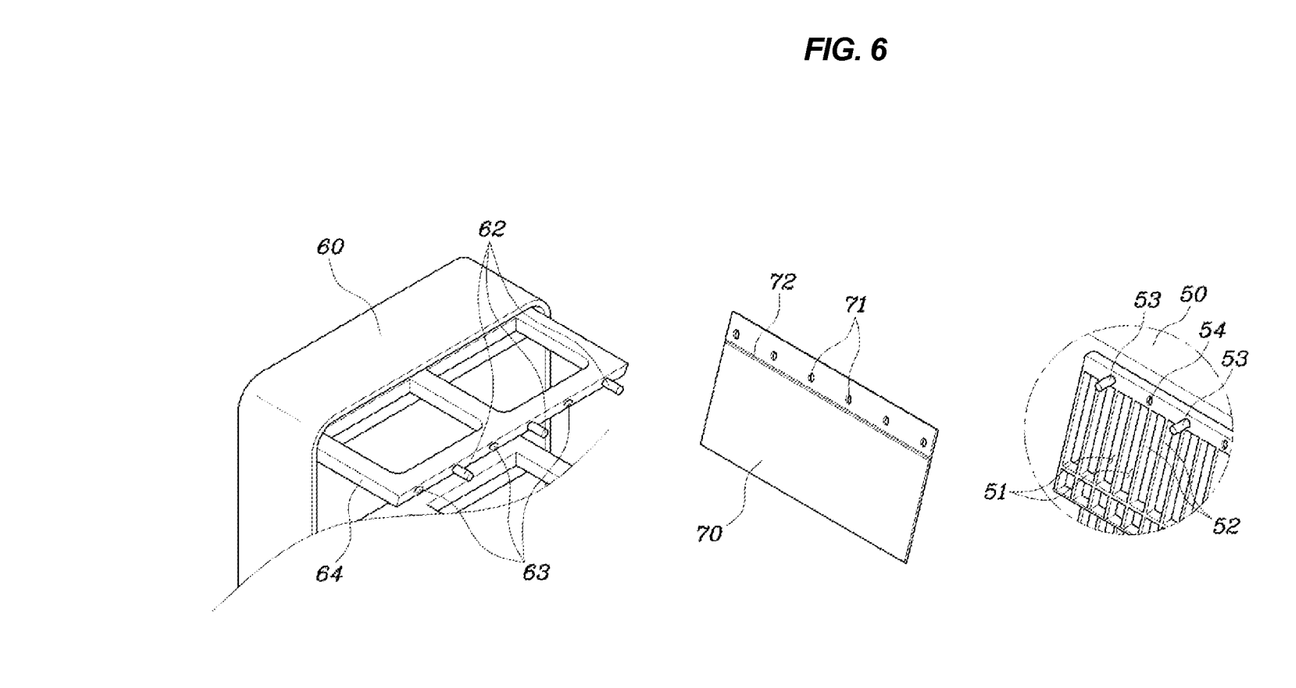
FIG. 6 is an enlarged view of a coupled portion of a valve of FIG. 5 according to the present invention.

An upper portion of the valve 70 is provided with a plurality of valve holes 71 which are spaced apart from each other in left and right directions and the valve holes 71 are penetrated and inserted with housing protrusions 53 formed in the housing 50 and cover protrusions 62 formed in the outer cover 60.

Further, the housing protrusions 53 and the cover protrusions 62 penetrate through the valve holes 71 in an opposite direction to each other and ends of the housing protrusions 53 penetrating through the valve holes 71 and ends of the cover protrusions 62 are each inserted into protruding holes 54 and 63, which are formed in the outer cover 60 and the housing 50, so as to be stably coupled with each other.

Here, since the housing protrusions 53 and the cover protrusions 62 have a structure to alternately penetrate through the valve holes 71 in the left and right directions of the valve 70 one by one, the valve 70 have a structure to be more stably coupled with the housing 50 and the outer cover 60.

Meanwhile, the upward bent part 61b forming the outer barrier rib 61 is integrally provided with a support rib 64 having an appearance of a E-letter shape which protrudes toward the grill 52 of the housing 50, in which a tip of the support rib 64 is provided with the cover protrusions 62 and the protruding holes 63.

Therefore, when an end of the housing protrusion 53 and an end of the cover protrusion 62 penetrate through the valve hole 71 and then are each inserted into the protruding holes 63 and 54 respectively, which are formed in the outer cover 60 and the housing 50, that is, when the outer cover 60 is assembled in the housing 50, both surfaces of the upper portion of the valve 70 have a structure to adhere to the tip of the support rib 64 and a portion at which the grill 52 is formed in the housing 50, respectively.

That is, according to the exemplary embodiment of the present invention, when the housing 50, the outer cover 60, and the valve 70 are assembled, since one surface toward an outside of the upper portion of the valve 70 has a structure to adhere to the tip of the support rib 64 and the other surface toward an inside thereof has a structure to adhere to a surface portion above the grill 52 in the housing 50, the phenomenon that a gap is generated between the valve 70 and the housing 50 and between the valve 70 and the outer cover 60 as in the related art may be removed, thereby completely cutting of the introduction of the external dust and noise, the exhaust gas, and the like into the vehicle when the valve 70 is closed.

Further, a notch groove 72 extending in a straight line up to left and right sides of the valve 70 is formed under the valve holes 71 at one surface of the valve 70 which directs to the outer cover 60, the notch groove 72 has a structure to be disposed under the support rib 64 so as not to contact the tip of the support rib 64, and the valve 70 is operated to open and close the through hole 51 while the lower portion of the valve 70 rotates based on the notch groove 72.

As described above, the air extractor grill according to various embodiments of the present invention has a structure in which one surface of the outside of the housing 50 is assembled with the outer cover 60, the outer cover 60 is provided with the plurality of outer barrier ribs 61, and each outer barrier rib 61 is provided with the upward bent part 61b and the downward bent part 61c which are vertically oriented to the upwards and downwards of a vehicle direction and when the valve 70 is opened, a flow of the external noise and dust and the exhaust gas partially stops by the upward bent part 61*b* and the downward bent part 61*c* and thus the introduction of the external noise and dust and the exhaust gas into the vehicle may be cut off as much as possible.

Further, according to various embodiments of the present invention, when the housing 50, the outer cover 60, and the valve 70 are assembled, the upper portion of the valve 70 has a structure to adhere to an inner surface of the housing 50 and the tip of the support rib 64 of the outer cover 60, and thus the phenomenon that the gap is generated between the valve 70 and the housing 50 and between the valve 70 and the outer cover 60 may be removed, thereby completely cutting off the introduction of the external dust and noise, the exhaust gas, and the like from into the vehicle when the valve 70 is closed.

Figure 8:
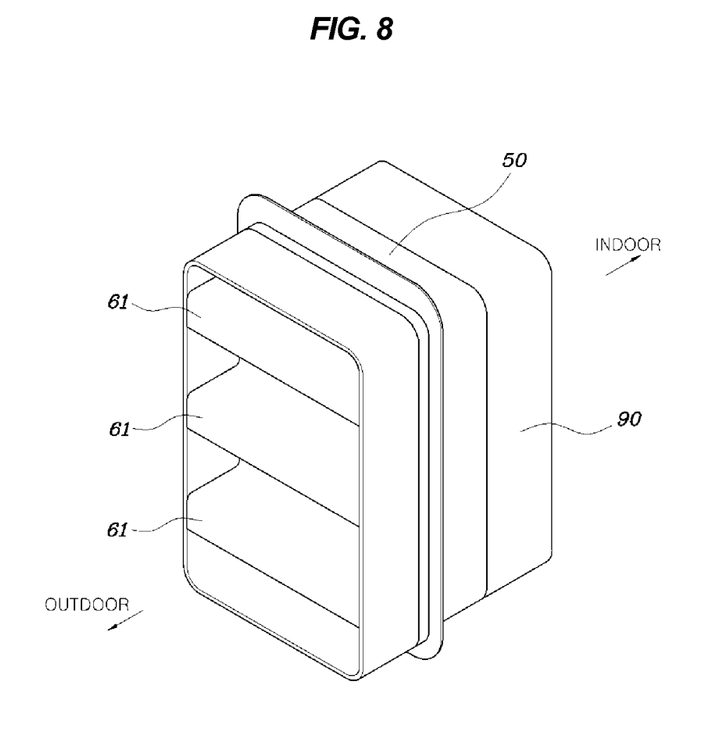
FIG. 8 is a perspective view of an exemplary air extractor grill according to the present invention.
Figure 9:
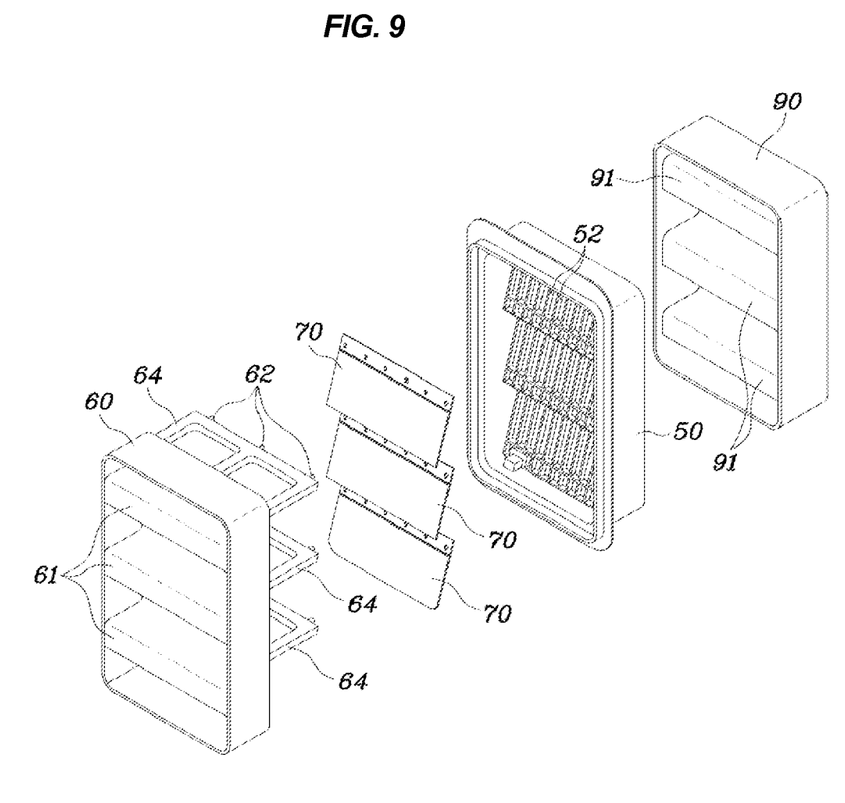
FIG. 9 is an exploded perspective view of FIG. 8 according to the present invention.
Figure 10:
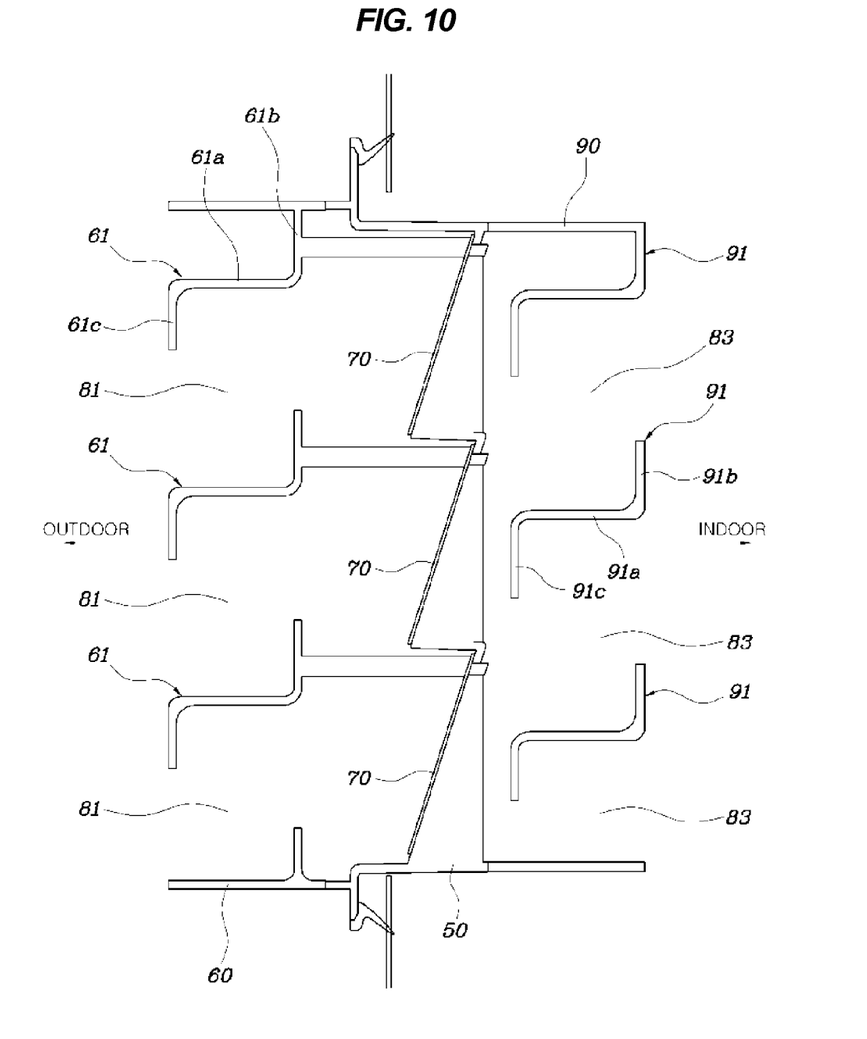
FIG. 10 is a longitudinal cross-sectional view of FIG. 8 according to the present invention.

Further, FIGS. 8 to 10 illustrate an air extractor grill for a vehicle according to various embodiments of the present invention, in which the air extractor grill for a vehicle has a structure in which the air extractor grill according to the foregoing embodiments of the present invention is further provided with only an inner cover 90.

That is, the air extractor grill for a vehicle is configured to include the housing 50 which is fixedly mounted at the portion connecting between the spaces inside and outside the vehicle and is provided with the through holes 51 provided with the plurality of grills 52, the outer cover 60 which is coupled to one surface of the outside of the housing 50 and has the opened inner space provided with the plurality of outer barrier ribs 61, an inner cover 90 which is coupled to the other surface of the inside of the housing 50 and has the opened inner space provided with a plurality of inner barrier ribs 91, and the plurality of valves 70 which have the upper portions fitted between the housing 50 and the outer cover 60 to be closely disposed to the housing 50 to seal the through holes 51 when the outer cover 60 is connected with the housing 50 and are operated to open the through holes 51 while lower portions of the plurality of valves 70 rotate toward the outer cover 60 based on the fixed upper portions when indoor air needs to be discharged to the outside.

Herein, the same components as the air extractor grill according to various embodiments of the present invention described with reference to FIGS. 4 to 7 will be described.

According to various embodiments of the present invention, the plurality of inner barrier ribs 91 formed in the inner cover 90 has a structure to be vertically spaced apart from each other in the inner cover 90 and air passages 83 facing the valves 70 are disposed between the inner barrier ribs 91 which are vertically disposed or between the inner barrier ribs 91 and the inner cover 90.

The air passage 83 becomes a passage through which air inside the vehicle may be discharged to the outside when the valves 70 are opened.

The inner barrier rib 91 includes a horizontal part 91*a* which extends in a direction in which the inner cover 90 is coupled with the housing 50, an upward bent part 91*b* which is bent upward from one end of the horizontal part 91*a*, and a downward bent part 91*c* which is bent downward from the other end of the horizontal part 91*a*.

That is, the inner barrier rib 91 has a structure having a zigzag shape in which the upward bent part 91*b*, the horizontal part 91*a*, and the downward bent part 91*c* are integrally connected to one another.

In this configuration, when the valve 70 is opened, the upward bent part 91*b* and the downward bent part 91*c* serve to cut off the introduction of the external noise and dust, the exhaust gas, and the like into the vehicle as much as possible.

That is, when the valve 70 is opened, the external noise and dust, the exhaust gas, and the like present at the outside may be introduced into the vehicle. In this case, the upward bent part 61*b* and the downward bent part 61*c* configuring the outer barrier rib 61 primarily cut off the introduction of the eternal noise and dust, the exhaust gas, and the like into the vehicle and the upward bent part 91*b* and the downward bent part 91*c* configuring the inner barrier rib 91 are secondarily cut off, such that the introduction of the external noise and dust, the exhaust gas, and the like into the vehicle may be more cut off than the structure according to the foregoing various embodiments of the present invention in which only the housing 50 and the outer cover 60 are formed.

The inner barrier ribs 91 have a structure in which at least both side portions thereof are integrally formed to be connected to the side portion inside the inner cover 90 and the inner barrier rib 91 disposed at a top portion among the inner barrier ribs 91 has a structure in which an end of the upward bent part 91*b* is also connected to the upper portion inside the inner cover 90.

Further, an end of the downward bent part 91*c* configuring the inner barrier rib 91 has a structure to be disposed between an end of the downward bent part 61*c* disposed at the top portion and the end of the upward bent part 61*b* disposed at the bottom portion in the outer barrier ribs 61 which are vertically disposed to be adjacent to each other.

That is, when the valve 70 is opened, in the case in which the external noise and dust, the exhaust gas, and the like which are present at the outside are introduced into the vehicle through the air passage 81 of the outer cover 60 and the through holes 51 of the housing 50, the downward bent part 91*c* of the inner barrier rib 91 has a structure to stop some of the through holes 51 and thus the introduction of the external noise and dust, the exhaust gas, and the like into the air passage 83 of the inner cover 90 may be largely reduced, thereby cutting off the introduction of the external noise and dust, the exhaust gas, and the like into the vehicle as much as possible.

According to various embodiments of the present invention, the air extractor grill may cut off the introduction of the external noise and dust, the exhaust gas, and the like into the vehicle as much as possible when the valve is opened and remove the generation of the gap between the valve and the housing and between the valve and the outer cover, thereby completely cutting off the external dust and noise, the exhaust gas, and the like into the vehicle when the valve is closed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air extractor grill for a vehicle, comprising:
a housing fixedly mounted at a portion on the vehicle separating inside and outside spaces of the vehicle and provided with through holes having a plurality of grills;
an outer cover coupled with one surface of an outside of the housing and having an opened inner space provided with a plurality of outer barrier ribs; and
a plurality of valves including upper portions fitted between the housing and the outer cover to be closely disposed to the housing to seal the through holes when the outer cover is connected with the housing, the plurality of valves being operated to open the through holes while lower portions of the plurality of valves rotate toward the outer cover based on the fixed upper portions when air inside the vehicle needs to be discharged to the outside of the vehicle,
wherein an upper portion of each valve of the plurality of valves is provided with a plurality of valve holes which are spaced apart from each other in left and right directions of each valve,
wherein each of the valve holes is penetrated and inserted with housing protrusions formed in the housing and cover protrusions formed in the outer cover,
wherein each of the housing protrusions and each of the cover protrusions penetrate through each of the valve holes in an opposite direction to each other, and
wherein ends of the housing protrusions penetrating through the valve holes and ends of the cover protrusions are each inserted into protruding holes which are formed in the outer cover and the housing.

2. The air extractor grill for a vehicle of claim 1, wherein each outer barrier rib of the plurality of outer barrier ribs is vertically spaced apart from each other in the outer cover, and air passages facing the valves are disposed between the outer barrier ribs or between the outer barrier ribs and the outer cover.

3. The air extractor grill for a vehicle of claim 1, wherein each outer barrier rib of the plurality of outer barrier ribs includes:
a horizontal part extending in a direction in which the outer cover is coupled to the housing;
an upward bent part bent upward from an end of the horizontal part; and
a downward bent part bent downward from another end of the horizontal part, wherein the each outer barrier rib is formed so that at least both side portions of the each outer barrier rib are connected to an inner surface of the outer cover.

4. The air extractor grill for a vehicle of claim 1, wherein the housing protrusions and the cover protrusions alternately penetrate through the valve holes in left and right directions of the valve one by one.

5. The air extractor grill for a vehicle of claim 1, wherein the upward bent part is integrally provided with a support rib which protrudes toward the grill, a tip of the support rib is provided with the cover protrusions and the protruding holes, and when an end of each housing protrusion and an end of each cover protrusion penetrate through each corresponding valve hole and then are each inserted into corresponding protruding holes formed in the outer cover and the housing, both surfaces of the upper portion of the valve adhere to the tip of the support rib and a portion at which the grill is formed in the housing, respectively.

6. The air extractor grill for a vehicle of claim 5, wherein a notch groove extending in a straight line up to left and right sides of each valve is formed under the valve holes at one surface of each valve which directs to the outer cover, the notch groove is disposed under the support rib to prevent contact with the tip of the support rib, and each valve opens and closes each through hole while each valve rotates based on the notch groove.

7. An air extractor grill for a vehicle, comprising:
a housing fixedly mounted at a portion on the vehicle separating inside and outside spaces of the vehicle and provided with through holes having with a plurality of grills;
an outer cover coupled with a surface of an outside of the housing and having an opened inner space provided with a plurality of outer barrier ribs;
an inner cover coupled with a surface of the inside of the housing and having an opened inner space provided with a plurality of inner barrier ribs; and
a plurality of valves including upper portions fitted between the housing and the outer cover to be closely disposed to the housing to seal the through holes when the outer cover is connected with the housing, the plurality of valves being operated to open the through holes while lower portions of the plurality of valves rotate toward the outer cover based on the fixed upper portions when air inside the vehicle needs to be discharged to the outside of the vehicle,
wherein an upper portion of each valve of the plurality of valves is provided with a plurality of valve holes which are spaced apart from each other in left and right directions of the each valve,
wherein each of the valve holes is penetrated and inserted with housing protrusions formed in the housing and cover protrusions formed in the outer cover,
wherein each of the housing protrusions and each of the cover protrusions penetrate through each of the valve holes in an opposite direction to each other, and
wherein ends of the housing protrusions penetrating through the valve holes and ends of the cover protrusions are each inserted into protruding holes which are formed in the outer cover and the housing.

8. The air extractor grill for a vehicle of claim 7, wherein each outer barrier rib of the plurality of outer barrier ribs are vertically spaced apart from each other in the outer cover and air passages facing the valves are disposed between the outer barrier ribs or between the outer barrier ribs and the outer cover.

9. The air extractor grill for a vehicle of claim 7, wherein each inner barrier rib of the plurality of inner barrier ribs are vertically spaced apart from each other in the inner cover, and air passages facing the valves are disposed between the inner barrier ribs or between the inner barrier ribs and the inner cover.

10. The air extractor grill for a vehicle of claim 7, wherein each outer barrier rib of the plurality of barrier ribs includes:
a horizontal part extending in a direction in which the outer cover is coupled to the housing;
an upward bent part bent upward from an end of the horizontal part; and
a downward bent part bent downward from another end of the horizontal part, wherein the each outer barrier rib is formed so that at least both side portions of the each outer barrier rib are connected to an inner surface of the outer cover.

11. The air extractor grill for a vehicle of claim 10, wherein each inner barrier rib of the plurality of inner barrier ribs includes:

a horizontal part extending in a direction in which the inner cover is coupled with the housing;

an upward bent part bent upward from an end of the horizontal part; and a downward bent part bent downward from another end of the horizontal part, wherein the each inner barrier rib is formed so that at least both side portions of the each inner barrier are connected to an inner surface of the inner cover.

12. The air extractor grill for a vehicle of claim 11, wherein an end of the downward bent part of the each inner barrier rib is disposed between an end of the downward bent part of an outer barrier rib disposed at a top portion and an end of the upward bent part disposed at a bottom portion in the outer barrier ribs which are vertically disposed to be adjacent to each other.

13. The air extractor grill for a vehicle of claim 7, wherein the housing protrusions and the cover protrusions alternately penetrate through the valve holes in left and right directions of the valve one by one.

14. The air extractor grill for a vehicle of claim 7, wherein the upward bent part is integrally provided with a support rib which protrudes toward the grill, a tip of the support rib is provided with the cover protrusions and the protruding holes, and when an end of each housing protrusion and an end of each cover protrusion penetrate through each corresponding valve hole and then are each inserted into corresponding protruding holes formed in the outer cover and the housing, both surfaces of the upper portion of the valve adhere to the tip of the support rib and a portion at which the grill is formed in the housing, respectively.

15. The air extractor grill for a vehicle of claim 14, wherein a notch groove extending in a straight line up to left and right sides of the each valve is formed under the valve holes at one surface of the each valve which directs to the outer cover, the notch groove is disposed under the support rib to prevent contact with the tip of the support rib, and each valve opens and closes each through hole while the each valve rotates based on the notch groove.

* * * * *